July 28, 1936. A. CLERC Re. 20,044

ELECTRIC CIRCUIT BREAKER WITH COMPRESSED GAS BLOW-OUT

Original Filed Feb. 9, 1932

Inventor:
André Clerc
by Edward H. Palmer
Atty.

UNITED STATES PATENT OFFICE 20,044

ELECTRIC CIRCUIT-BREAKER WITH COMPRESSED GAS BLOW-OUT

André Clerc, Villeurbanne, France, assignor to Societe Ateliers de Constructions Electriques de Delle, Paris, France Original No. 1,944,402, dated January 23, 1934, Serial No. 591,893, February 9, 1932. Application for reissue November 8, 1935, Serial No. 48,898. In Germany February 9, 1931

8 Claims. (Cl. 200—148)

My co-pending application No. 503,835 filed Dec. 20th, 1930, relates to an electric circuit-breaker provided with a compressed gas arc blowing out device whose particularity resides in the use of at least one pair of contacts shunted by a resistance.

According to another co-pending application No. 549,001 filed July 6th, 1931, the extinction of the arc is realized by blowing the said arc towards one of several main electrodes each of which is connected to one extremity of a resistance, the other extremity being connected to an auxiliary electrode.

According to the present invention, the operation of this circuit-breaker is improved. The circuit-breaker in accordance with this invention is characterized in this that the arc blown perpendicularly to the displacement of the movable contact meets electrodes connected to the resistance to be inserted and disposed one behind the other, the length of the electrodes penetrating into the chimney, their spacing and the velocity of blowing being so chosen that the resistance elements will shunt a certain length of that portion of the arc which is approximately parallel to the direction of the blowing.

The annexed drawing shows diagrammatically two forms of embodiment of the object of the invention.

In this drawing, Fig. 1 is a schematic representation of a circuit-breaker according to the invention.

Figure 1:
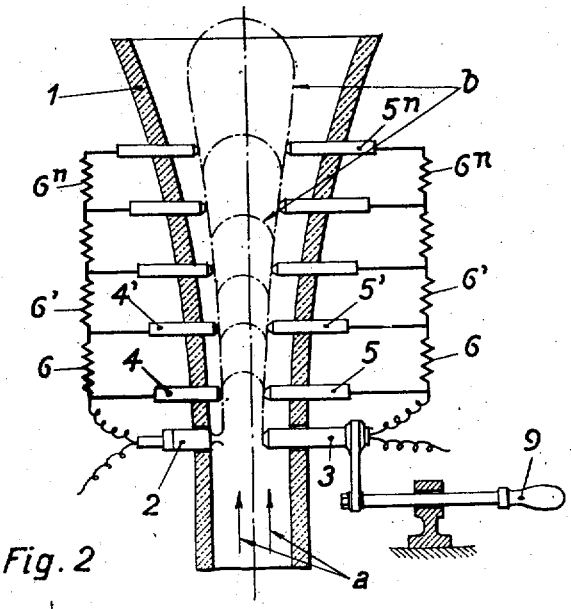
Figure 2:
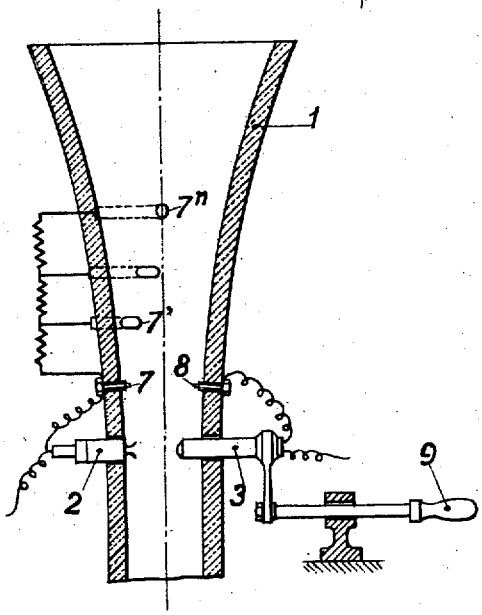
Fig. 2 is a similar view with modified arrangement of the electrodes.
Figure 3:
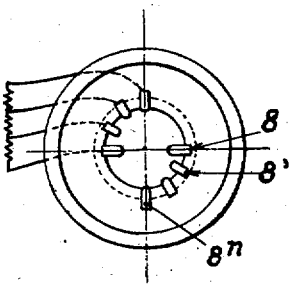
Fig. 3 is a plan view of Fig. 2.

Referring to the drawing, 1 shows the divergent chimney in which takes place the blowing of the arc. 2 indicates the fixed contact and 3 the movable contact actuated by any suitable means indicated diagrammatically, in the present instance, by numeral 9, the direction of the blowing is indicated by the arrows *a*. Behind the contacts 2 and 3 (considered in the direction of the blowing) are disposed two series of electrodes 4, 4', 4'' . . . on the one side and 5, 5', 5'' . . . on the other side, these said electrodes traversing the wall of the chimney and being coupled together by the low resistances 6, 6' 6'' . . . .

On the other hand, the electrode 4 is connected directly to the contact 2 and the electrode 5 to the movable contact 3.

The spacing between the extremities of the electrodes 4, 4' . . . and the extremities of the electrodes 5, 5' . . . can remain constant throughout the whole length of the series of electrodes, or as seems more advantageous this spacing can increase in the direction of the blowing as shown in the drawing.

In the described device, the arc develops itself along the dot and dash lines *b*. These lines clearly show that any two pairs of electrodes 4—5 can only be reached successively by the arc, and consequently the resistance elements 6, 6' are inserted successively into the circuit. However, by reason of the high speed of development of the arc under the influence of the flow of air the electrodes are thrown into circuit practically simultaneously, and as a consequence the whole of the resistances is inserted into the circuit by the time the current passes through zero for the first time. At this instant the arc is only maintained between the electrodes $4^n$ and $5^n$ and subsists for half a period at a maximum.

Instead of utilizing two series of electrodes as indicated on the drawing, one could utilize a greater number.

On the other hand, the different series of electrodes utilized can be disposed along diametrically opposed generatrices (intersection line between the conical chimney and a plane on the axis of the cone), of the chimney as shown on the drawing, or along several large pitch spirals.

Having now particularly described and ascertained the nature of my said invention and in what manner the same is to be performed, I declare that what I claim is:

1. In a circuit-breaker, two relatively movable contacts between which an arc is adapted to be struck; means to blow onto said arc a blast of compressed gases perpendicularly to the movable contact displacement; a chimney adapted to surround the arc lengthened by the blast; and electrodes in said chimney having resistances connected therebetween and to one of the contacts, said electrodes being placed behind the contacts and one after the other, when seen in the direction of blowing, whereby the length of electrodes projecting inside the chimney, their spacing, and the blowing speed are adapted to permit intermediary points of the arc to be blown onto the electrodes and to shunt the resistances by portions of the arc parallel to the blowing direction.

2. In a circuit-breaker, two relatively movable contacts between which an arc is adapted to be struck; means to blow onto said arc a blast of compressed gases perpendicularly to the movable contact displacement; a chimney adapted to surround the arc lengthened by the blast; electrodes disposed through said chimney and projecting within the same; and resistances connected to the electrodes and one of the contacts, said electrodes being placed behind the contacts and disposed along a high-pitched spiral.

3. A circuit-breaker comprising contacts between which an arc is adapted to be struck; means to blow a gas blast against said arc, a contact being adapted to be displaced transversely to the direction of said blast; a chimney adapted to surround said contacts and the arc lengthened by said blast; a resistance; and an electrode in said chimney connected through said resistance to one of said contacts, said electrode being placed behind said contacts viewed in the direction of said blast, the whole being adapted to permit an intermediate point of said arc to be blown onto said electrode and to shunt said resistance by a portion of the arc which is thus extinguished, the other portion of said arc being thus placed in series with said resistance.

4. A circuit-breaker comprising contacts between which an arc is adapted to be struck; means to blow a gas blast against said arc, a contact being adapted to be displaced transversely to the direction of said blast; a chimney adapted to surround said contacts and the arc lengthened by said blast; an electrode projecting inside said chimney; and a low resistance connected to one contact and to said electrode, the whole being adapted to permit an intermediate point of said arc to be blown against said electrode and to shunt said resistance by a portion of said arc which is thus extinguished, the other portion of said arc being thus placed in series with said resistance.

5. A circuit-breaker comprising contacts between which an arc is adapted to be struck; means to blow a gas blast against said arc, a contact being adapted to be displaced transversely to the direction of said blast; a chimney adapted to surround said contacts and the arc lengthened by said blast; a resistance; and an electrode in said chimney connected through said resistance to one of said contacts, said electrode being located in the axis of the gas blast and behind said contacts viewed in the direction of the blast, the whole being adapted to permit an intermediate point of said arc to be blown against said electrode and to shunt said resistance by a portion of said arc which is thus extinguished, the other portion of said arc being thus placed in series with said resistance.

6. A circuit-breaker comprising two relatively movable contacts between which an arc is adapted to be struck; means to blow a gas blast against said arc, the path of relative movement of said contacts being transverse to the direction of said blast; a chute adapted to surround the arc lengthened by said blast; several stationary electrodes in said chute, said electrodes being located behind said contacts viewed in the direction of said blast; ohmic resistances connected between the electrodes, one of said electrodes at least being connected to one of said contacts, the whole being arranged so that several intermediate points along the arc formed between said contact are blown against said electrodes by said blast, whereby fractions of said arc are shunted by a resistance and extinguished, the remaining portions of said arc being thus placed in series with said resistances.

7. A circuit-breaker comprising two relatively movable contacts between which an arc is adapted to be struck; means to blow a gas blast against said arc, the path of relative movement of said contact being transverse to the direction of said blast; a chute adapted to surround said arc lengthened by said blast; several stationary electrodes in said chute, said electrodes being located behind said contacts when viewed in the direction of said blast and symmetrically disposed on two opposite sides of said chute; ohmic resistances connected between said electrodes, one of said electrodes at least being connected to one of said contacts, the whole being arranged so that several intermediate points along the arc formed between said contacts are blown onto said electrodes, whereby fractions of said arc are shunted by a resistance and extinguished, the remaining portions of said arc being thus placed in series with said resistances.

8. A circuit-breaker comprising an arc chute having divergent opposed walls; relatively movable contacts in said chute; several stationary electrodes disposed radially in said chute; ohmic resistances connected between said electrodes, one of said electrodes at least being connected to one of said contacts; and means for blowing a gas blast in said chute transversely to the path of relative movement of said contacts and along said electrodes.

ANDRÉ CLERC.